Jan. 12, 1926.  1,569,219
A. Y. DODGE
BRAKE AND METER CONSTRUCTION
Filed March 13, 1924
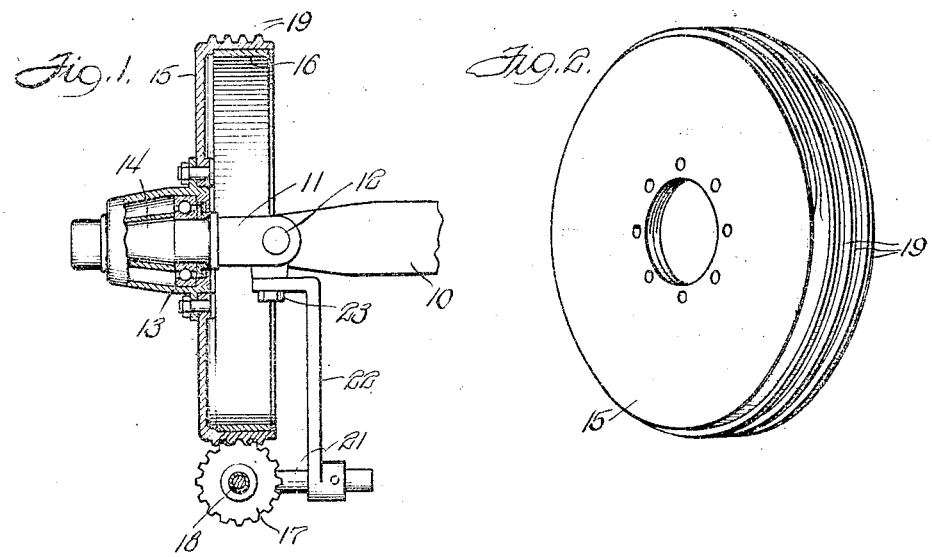
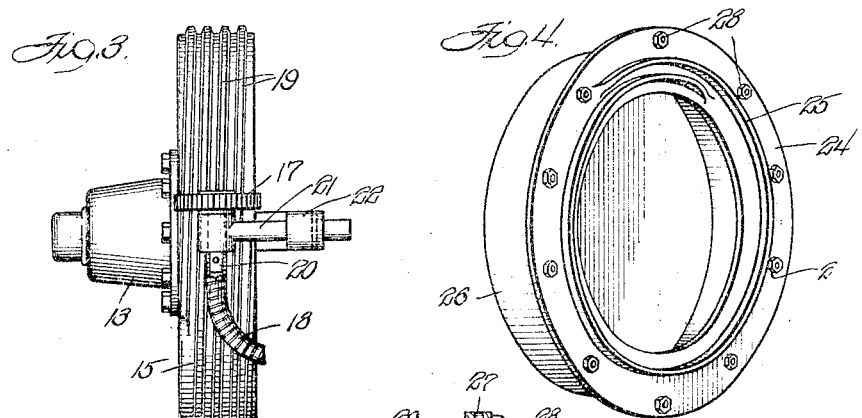
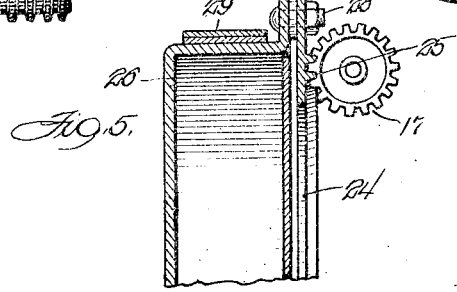
Inventor:
Adiel Y. Dodge
By Jones, Addington, Ames & Seibold
Attys.

Patented Jan. 12, 1926.

1,569,219

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE AND METER CONSTRUCTION.

Application filed March 13, 1924. Serial No. 698,860.

*To all whom it may concern:*

Be it known that I, ADIEL Y. DODGE, a citizen of the United States, residing at South Bend, in the county of St. Joseph and State of Indiana, have invented new and useful Improvements in Brake and Meter Constructions, of which the following is a full, clear, concise, and exact description, reference being had to the accompanying drawing, forming a part of this specification.

My invention relates to brake and meter construction for automobiles.

One of the objects of my invention is to provide means whereby the meter of a taxicab may be driven from the front wheel and at the same time the front wheel may be provided with a brake.

Further objects will appear from the description and claims.

In the drawings, in which two forms of my invention are shown—

Figure 1 is a horizontal view showing the steering knuckle, brake drum, and associated parts;

Fig. 2 is a perspective view of the brake drum;

Fig. 3 is an elevational view of the brake drum showing the pinion and meter shaft;

Fig. 4 is a perspective view showing a different form of brake, and

Fig. 5 is a fragmentary sectional view of the construction shown in Fig. 4.

In taxicab work it is sometimes desirable that the meter should be driven from the front wheel, as the rear wheels are subject to slippage and the meter driven from the rear wheel or from the propeller shaft would not register the milage correctly. It is also desirable that the front wheels as well as the rear wheels be equipped with brakes. To accomplish these two results, I mount a brake drum to turn with the front wheel—and drive the meter from this brake drum.

Referring to the construction shown in Figs. 1, 2 and 3, this comprises the front axle 10, a steering knuckle 11, pivotally mounted on the axle by means of the steering knuckle pin 12, the front wheel hub 13 mounted on the axle 14, which extends from the steering knuckle 11, a brake drum 15 secured to the hub 13, internal brake means 16, bearing on the inner surface of the brake drum, a worm pinion 17 driven from the brake drum and a flexible shaft 18 driven from the pinion 17.

The pinion 17 is driven from the brake drum by means of helical threads 19 on the outer surface of the brake drum, which threads form a worm gear. These helical threads also act as heat radiating ribs and may be die-cast with the brake drum.

The pinion 17 is mounted on a stub shaft 20 supported in a bearing bracket 21, which in turn is adjustably mounted on the bracket 22 secured at 23 to the steering knuckle 11.

In Figs. 4 and 5 is shown a somewhat different form which can be used with an external type of brake. In this form, the meter pinion 17 is driven from a ring gear 24 having a spiral thread 25 secured to the inner face of the brake drum 26. In order to permit drainage of the brake drum in case water should get splashed into it, the spiral gear is spaced somewhat from the inner face of the drum by means of washers 27 through which the securing bolts 28 extend.

This construction and arrangement of the meter drive permits the use of external brake bands 29.

While I have shown but two forms of my invention, it is obvious that it may be embodied in other forms covered and defined by the claims.

Having thus described my invention, what I claim as new and desire to secure by Letters Patent of the United States is:—

1. A brake and meter construction comprising an axle, a steering knuckle mounted on said axle, a road engaging wheel mounted on said steering knuckle, a brake drum mounted to turn with said wheel, a meter shaft, and transmission means for driving said meter shaft from said brake drum comprising a pinion mounted on said shaft, and a worm on said brake drum meshing with said pinion, said worm comprising a rib extending circumferentially with respect to said brake drum and located on the periphery thereof, said rib being of heat conducting material and serving as a heat radiating member.

2. An automobile brake drum having a circumferentially-extending heat-radiating worm thread at its periphery.

3. An automobile brake drum having a cylindrical braking flange and a circumferentially-extending heat-radiating worm thread on the exterior of said flange.

In witness whereof, I have hereunto subscribed my name.

ADIEL Y. DODGE.